United States Patent
Krotsch

(10) Patent No.: US 8,664,826 B2
(45) Date of Patent: Mar. 4, 2014

(54) PERMANENT MAGNET EXCITED ELECTRIC MOTOR WITH REDUCED COGGING TORQUE

(75) Inventor: Jens Krotsch, Niederstetten (DE)

(73) Assignee: EBM-Papst Mulfingen GmbH & Co. KG, Mulfingen (DE)

( * ) Notice: Subject to any disclaimer, the term of this patent is extended or adjusted under 35 U.S.C. 154(b) by 234 days.

(21) Appl. No.: 13/084,593

(22) Filed: Apr. 12, 2011

(65) Prior Publication Data

US 2011/0248595 A1 Oct. 13, 2011

(30) Foreign Application Priority Data

Apr. 13, 2010 (EP) ..................... 10159797

(51) Int. Cl.
*H02K 1/14* (2006.01)
*H02K 1/16* (2006.01)
*H02K 21/22* (2006.01)

(52) U.S. Cl.
USPC ......... 310/216.092; 310/216.094; 310/156.46

(58) Field of Classification Search
USPC ............... 310/216.092, 216.093, 216.094, 310/216.095, 156.47, 156.46
IPC ..................... H02K 1/14,1/16, 21/22
See application file for complete search history.

(56) References Cited

U.S. PATENT DOCUMENTS

| | | | |
|---|---|---|---|
| 4,280,072 A * | 7/1981 | Gotou et al. | 310/156.26 |
| 4,933,584 A | 6/1990 | Harms et al. | |
| 5,331,245 A * | 7/1994 | Burgbacher et al. | 310/216.092 |
| 5,773,908 A * | 6/1998 | Stephens et al. | 310/216.094 |
| 6,744,171 B1 * | 6/2004 | Kolomeitsev | 310/254.1 |
| 2005/0023919 A1 | 2/2005 | Nakano et al. | |
| 2005/0242681 A1 * | 11/2005 | Ionel et al. | 310/216 |

FOREIGN PATENT DOCUMENTS

| | | |
|---|---|---|
| DE | 2850478 C3 | 5/1980 |
| DE | 3710658 A1 | 10/1988 |
| DE | 29510938 U1 | 9/1995 |
| DE | 19901310 A1 | 10/1999 |
| DE | 10247187 A1 | 6/2003 |
| DE | 3723099 C2 | 10/2003 |
| DE | 10147310 B4 | 6/2004 |
| DE | 10303848 A1 | 8/2004 |
| DE | 102006047604 | 4/2008 |
| EP | 0081524 B1 | 1/1986 |
| EP | 0545060 B1 | 4/1995 |
| EP | 0473534 B1 | 10/1995 |
| EP | 0375228 B2 | 12/1999 |
| EP | 1246 349 A2 | 10/2002 |
| JP | 56153961 | 11/1981 |

* cited by examiner

*Primary Examiner* — Burton Mullins
*Assistant Examiner* — Michael Andrews
(74) *Attorney, Agent, or Firm* — Brinks Gilson & Lione

(57) ABSTRACT

An electric motor (1) has a stator (2) and a radially symmetric, permanent magnet excited rotor (4) coaxial with the stator (2). The rotor (4) rotates relative to the stator (2) about a common motor axis (X). The stator (2) has a radially symmetric iron core (6) with a defined number (N) of stator teeth (10) which are each adjacent to one another via stator slots (8) and slot openings (8a) in the circumferential direction. The rotor (4) has pole magnets (14) adjacent to one another. A circumferential gap (18) is formed radially between the pole magnets (14) and the stator teeth (10). Each stator tooth (10) has on its surface (20) facing the gap (18) and adjacent to the slot openings (8a) on both sides in the circumferential direction a relief-like topographic region (22) radially enlarging the gap (18) with least one concave recess (24) and a smooth profile.

12 Claims, 4 Drawing Sheets

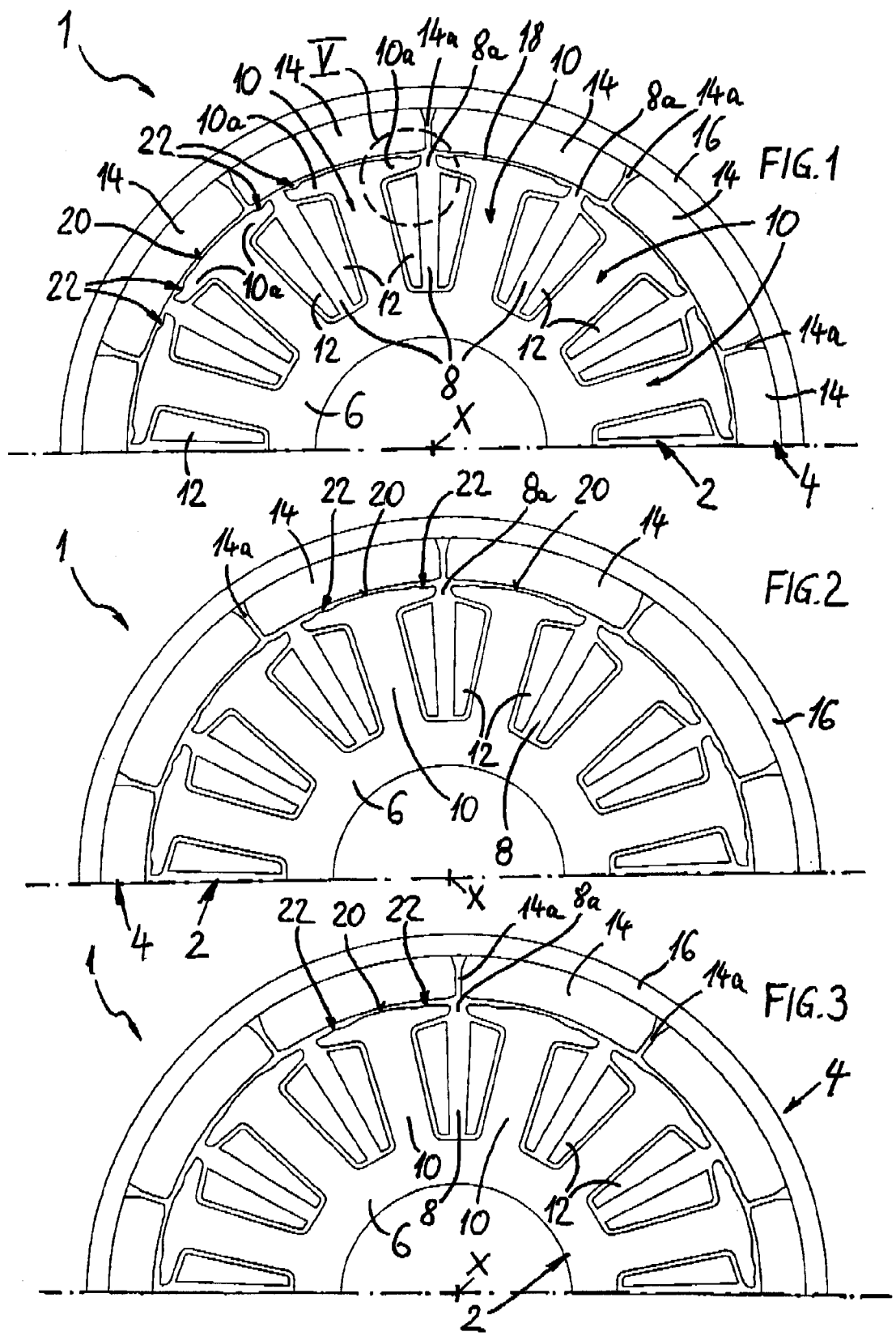

US 8,664,826 B2

PERMANENT MAGNET EXCITED ELECTRIC MOTOR WITH REDUCED COGGING TORQUE

TECHNICAL FIELD OF THE INVENTION

The present invention relates to an electric motor with a stator and a radially symmetric, permanent magnet excited rotor provided for rotation about a common motor axis relative to the coaxial stator, wherein the stator has a radially symmetric iron core with a defined number of stator teeth respectively adjacent via stator slots and slot openings in the circumferential direction, and wherein the rotor has a defined number of pole magnets arranged around the circumference and adjacent to one another via pole transitions and a circumferential gap is formed radially between the pole magnets of the rotor and the teeth of the stator.

BACKGROUND OF THE INVENTION

Electric motors of this kind—frequently also known as permanent magnet excited motors—are well-known; they are characterized by a high degree of efficiency and are suitable—in particular in an embodiment as an external rotor motor—as drive mechanisms for fans and blowers. Owing to magnetic conductance fluctuations along the gap which are caused by the grooves of the iron core of the stator, usually of the stator lamination stack, torque fluctuations, known as cogging torques, occur during the operation of these motors which disadvantageously can result in vibrations and noise. In the particular case of fans which are used in refrigeration and air conditioning, however, low-noise operation with a high degree of efficiency is required.

Some measures for reducing the cogging torques in permanent magnet excited motors are known from the prior art. For example, DE 101 47 310 B4 describes cup-shaped magnet segments with oblique sides arranged in the axial direction. Due to the likewise obliquely arranged pole transitions, the cogging torque is reduced here. At the same time, however, the permanent magnetic flux linkage and thus the torque density and the degree of efficiency are decreased in comparison to an embodiment with straight transitions. Furthermore, the production of such magnet segments is associated with additional costs.

Magnet segments with axially oblique sides are also known in the other documents DE 199 01 310 A1, DE 295 10 938 U1, JP 561 53 961 A as well as in EP 0 375 228 B2 and/or U.S. Pat. No. 4,933,584.

Documents EP 0 375 228 B2 and/or U.S. Pat. No. 4,933,584 describe rectangular or semi-circular concave recesses at the stator teeth. The recesses discontinuously merge into one another with steps and edges in the circumferential direction. The recesses are additionally arranged obliquely in the axial direction as well as the slots. In addition, the magnetization of the permanent magnets is implemented obliquely in the axial direction. This is known to reduce not only the cogging torque, but also the torque density and the degree of efficiency of the motor. In particular an oblique slot is also associated with an increased expense for introducing the winding. Furthermore, the beveling here also results in the reduction in permanent magnet flux linkage and thus to a reduction in torque.

Document JP 56 153 961 A describes recesses at the teeth with the objective of reducing the cogging torque, however, with uneven slot division (tooth widths). Thus, primary and auxiliary teeth are produced. The recesses have the shape of concave semicircles and discontinuously merge into one another with steps and edges in the circumferential direction. With respect to the central axes of the slots, the recesses at the teeth are asymmetrical. Furthermore, the magnetization of the permanent magnets runs obliquely and/or offset in the axial direction. A beveling of this kind is known to reduce the permanent magnet flux linkage and thus the torque density and the degree of efficiency of the motor.

The other documents DE 28 50 478 C3, EP 0 081 524 B1, EP 0 473 534 B1 and EP 0 545 060 B1 respectively describe permanent magnets with straight sides, but oblique pole transitions owing to the corresponding magnetization. This embodiment likewise has a negative effect on the torque density and the degree of efficiency. In addition, an oblique pole transition has still another disadvantage. The actually favorable angle of inclination for reducing the cogging torque depends on the axial length of the stator and/or stator iron core (stator lamination stack), so that separate magnetization devices have to be available for each different length.

Document DE 37 10 658 A1 relates to a dc motor with a rotor featuring multi-part permanent magnets in the axial direction, wherein the individual parts are arranged offset to one another in the circumferential direction. This arrangement basically also results in the reduction in cogging torque, but at the expense of the torque density and the degree of efficiency as well as in connection with increased manufacturing expenses for installing the partial magnets and their magnetization.

Document DE 37 23 099 C2 describes an embodiment with a gap which is periodically different in the circumferential direction formed by axial, magnetically conducting elevations in the form of cams on the stator teeth. In this case, the cams protrude into the gap. Under consideration of manufacturing tolerances, the overall size of the gap must be designed larger in order to ensure a sufficient gap in the region of the cams as well. As a result of this, however, the torque density and the degree of efficiency are reduced, and/or increased manufacturing expenses are required to achieve greater accuracy.

Finally, DE 103 03 848 A1 describes an asymmetrical arrangement of the magnets around the circumference of the rotor for the reduction of the cogging torque. This solution is associated with additional manufacturing expenses for the exact positioning of the magnets. Furthermore, the asymmetry resulting in this way has an adverse impact on the electromagnetically produced torque in the form of additional alternating torques in comparison with a symmetric arrangement.

SUMMARY OF THE INVENTION

The present invention is based on the problem of providing an electric motor of the kind described above which has a low cogging torque as well as a high degree of efficiency and an efficient material utilization (torque density). In other words, the cogging torque should be reduced without negatively affecting the efficiency and torque density. In addition, it should be possible to produce the electric motor at low manufacturing expenses.

According to the present invention, each stator tooth has on its surface facing the gap and starting at its side regions adjacent to the slot openings neighboring on both sides in the circumferential direction, a relief-like topographic region radially enlarging the gap in regions, said topographic region having at least one concave recess and an uninterrupted, smooth and edge-free, and thus wave-like, profile in the circumferential direction. The term "uninterrupted profile" is understood to mean that the radius of the stator tooth continuously changes without gaps in the circumferential direction. The wave-like contour thus runs along a continuous curve, wherein all regions adjoin one another tangentially without kinks. The stator teeth in the wave-like topographic regions as well as in the region of the slot openings are advantageously straight, when seen in the axial direction, and/or are configured running parallel to the motor axis, so that all disadvantages of oblique embodiments, as they are described above, are advantageously avoided. The motor according to the present invention is thus primarily simple to manufacture at low cost, and especially in connection with a tooth winding of the stator iron core, wherein the windings are wound through the stator slots around the stator teeth.

Due to the wave-like topographic regions according to the present invention, which are preferably configured symmetrically in the circumferential direction with respect to the radial central axes of the slots as well as with respect to the radial central axes of the teeth, the cogging torque can advantageously be reduced with nearly no negative effect on the degree of efficiency of the motor or on the torque density. The operating principle can be illustrated as follows. The cogging torque is produced by an interaction of the magnet pole transitions of the rotor with the slot openings of the stator. The recesses in the wave-like topographic regions provided according to the present invention basically also generate a torque fluctuation, which, however, due to an offset in the circumferential direction with respect to the slot openings, acts in counter-phase to the cogging torque and has a similar amplitude here. This torque fluctuation generated by the recesses in the material according to the present invention and the actual cogging torque overlap and they partly or entirely cancel each other out as a resultant effect.

Further special characteristics of the embodiment will be explained in more detail below.

For this purpose, the invention will be explained in more detail below with reference to the drawing and to the preferred exemplary embodiments of the invention illustrated therein.

BRIEF DESCRIPTION OF THE DRAWINGS

In the drawings,

FIG. 1 shows a simplified, schematic semi-cross section of a first embodiment of an electric motor according to the present invention, configured as an external rotor motor;

FIG. 2 shows a simplified, schematic semi-cross section of a second embodiment of an electric motor according to the present invention, configured as an external rotor motor;

FIG. 3 shows a simplified, schematic semi-cross section of a third embodiment of an electric motor according to the present invention, configured as an external rotor motor;

DETAILED DESCRIPTION OF THE DRAWINGS

Figure 4:
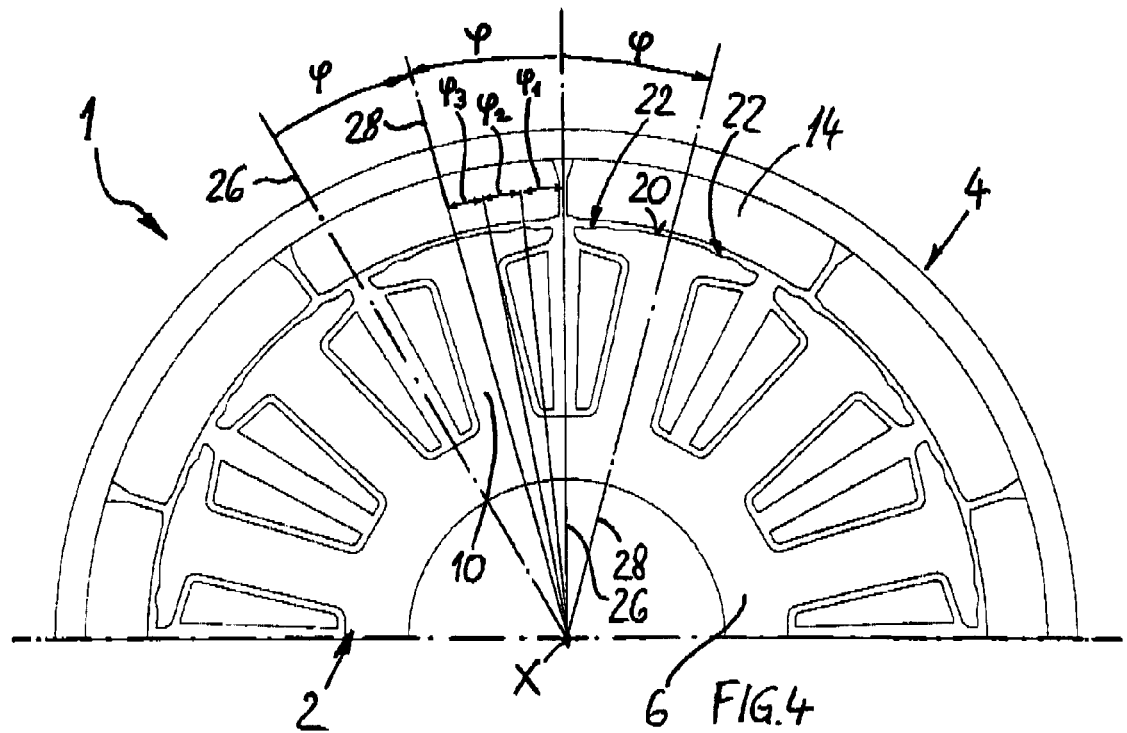
FIG. 4 shows an illustration as in FIG. 2 with additionally indicated angles.

Same parts in the different figures of the drawing are always provided with the same reference numerals.

As is initially apparent from FIGS. 1 to 4, an electric motor 1, which is only shown schematically, consists of a stator 2 and a rotor 4. The stator 2 and the rotor 4 are arranged coaxially to one another with respect to a common motor axis X, wherein the rotor 4 can be rotated relative to the stator 2 about the motor axis X. In the illustrated exemplary embodiments, the electric motor 1 is configured as an external rotor motor, wherein the rotor 4 coaxially encloses the stator 2. The present invention is basically, however, also suitable for internal rotor motors in which the rotor is known to rotate inside the stator.

The stator 2 has a radially symmetric iron core 6, which is usually designed as a stator lamination stack made of layered sheets. The iron core 6 has a defined number N of stator teeth 10 which are each adjacent in the circumferential direction via stator slots 8 and slot openings 8a. The stator teeth 10 are aligned radially with respect to the motor axis X and overall have a T-shaped configuration each seen in radial cross section, with pole shoes 10a symmetrically extending on both sides in the circumferential direction. Each stator tooth 10 supports one of several stator windings 12, which are wound in the form of a so-called tooth winding through the stator lots 8 around the stator teeth 10.

The rotor 4 is configured radially symmetric and has a defined number P of pole magnets 14 arranged distributed around the circumference, each pole magnet being adjacent to one another via pole transitions 14a. These pole transitions 14a can be defined, as illustrated, either with intervals between individual magnet elements, or, when using a one-part ring magnet or a magnet band arranged ring-shaped, by zero crossings of the rotor magnetization in the transition regions from one polarity of the rotor magnet to the following, opposite polarity. All pole magnets 14 are connected via a common, soft magnetic return element 16. In the illustrated exemplary embodiment as an external rotor motor, the pole magnets 14 are arranged on the inner circumference of the cylindrical return element 16.

An essentially cylindrical gap 18 is formed radially on the circumference between the rotor pole magnets 14 and the stator teeth 10. This gap 18 allows the rotation of the rotor 4, wherein this rotation is caused by means of the interaction of the magnetic field of the stator, generated by triggering the stator windings 12 via the gap 18, with the magnet fields of the pole magnets 14. Normally, at least in known electric motors, fluctuations in torque, so-called cogging torque (see the diagram in FIG. 8 for the torque characteristic A), result due to the fluctuations in magnetic conductance along the gap 18, caused by the interaction between the stator slots 8 and/or the slot openings 8a and the pole transitions 14a between the pole magnets 14.

In order to eliminate this cogging torque, or at least reduce it significantly, the present invention provides that each stator tooth 10 has on its surface 20, which actually curved semi-circularly in the circumferential direction, facing the gap 18 and starting at its side regions adjacent to the slot openings 8a neighboring on both sides in the circumferential direction, a relief-like topographic region 22 radially enlarging the gap 18 in regions, said topographic region having at least one concave recess 24 (see in particular the enlarged views in FIGS. 5 to 7) and having an uninterrupted, wave-like, smooth and edge-free profile in the circumferential direction. In this case, the stator teeth 10 run straight in the wave-like topographic regions 22 as well as in the region of the stator slots 8 and slot openings 8a when seen in the axial direction, and/or parallel to the motor axis X. This advantageously also applies accordingly to the rotor 4, that is, the pole magnets 14 have straight sides, and the pole transitions 14a are configured axially straight. Thus, within the meaning of the above object, a simple and low cost production of the electric motor 1 is possible. Nonetheless, a significant reduction in cogging torque is achieved with the invention (see the dashed torque characteristic B in FIG. 8).

In one convenient embodiment the wave-like topographic regions 22 in the circumferential direction are configured symmetric on the surfaces 20 of the stator teeth 10 with respect to central radial axes of the slots 26 as well as correspondingly also with respect to the central radial axes of the teeth 28. For this purpose reference is made in particular to the illustration in FIG. 4, wherein each wave-like topographic region 22 relative to the central axis of the slot 26 of the adjacent stator slot 8 extends via a circumferential angle φ in the direction of the central radial axis of the teeth 28, wherein the maximum circumferential angle φ is equal to the quotient of the total stator circumference of 360° divided by twice the number 2N of stator slots 8 and/or stator teeth 10, respectively. Consequently, we have the relation $$\varphi \leq \frac{360°}{2N}.$$

Figure 6:
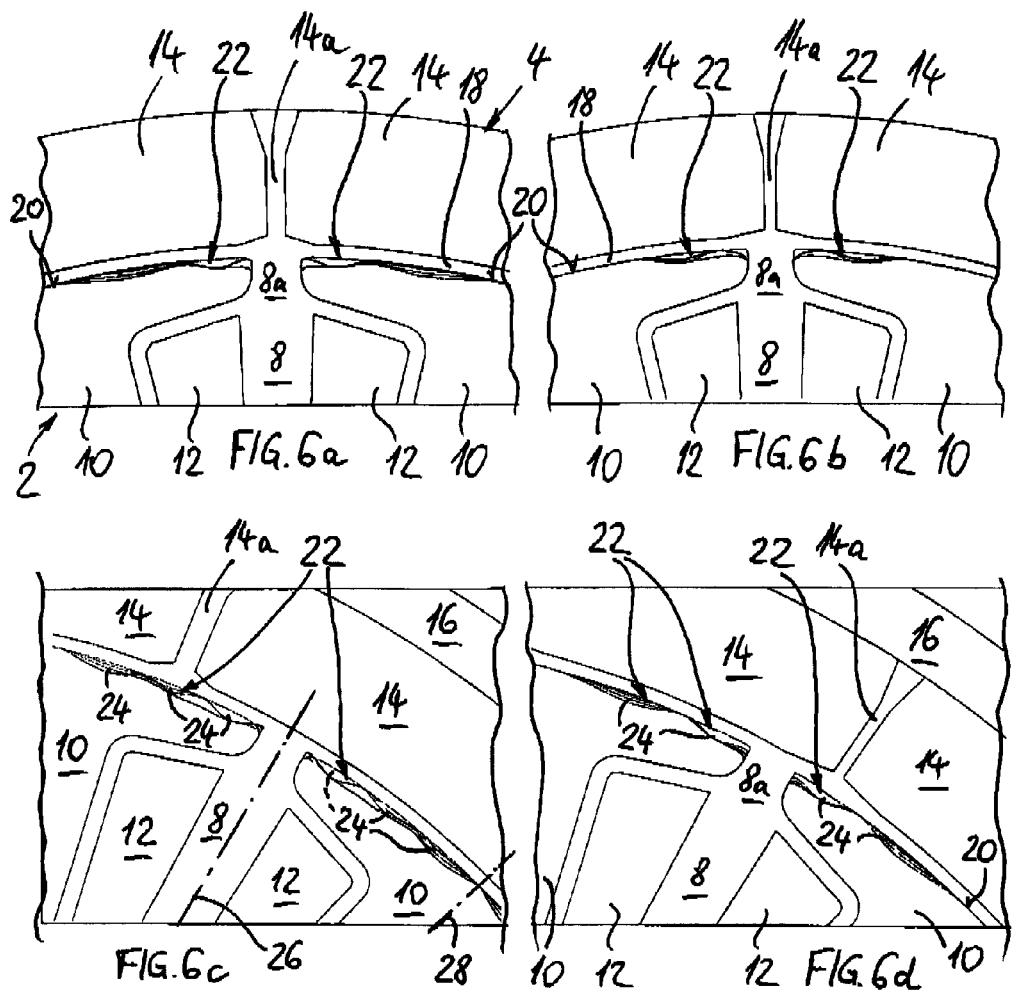
FIG. 6 shows, in sub-figures 6a to 6d, partial views of different embodiments.
Figure 7:
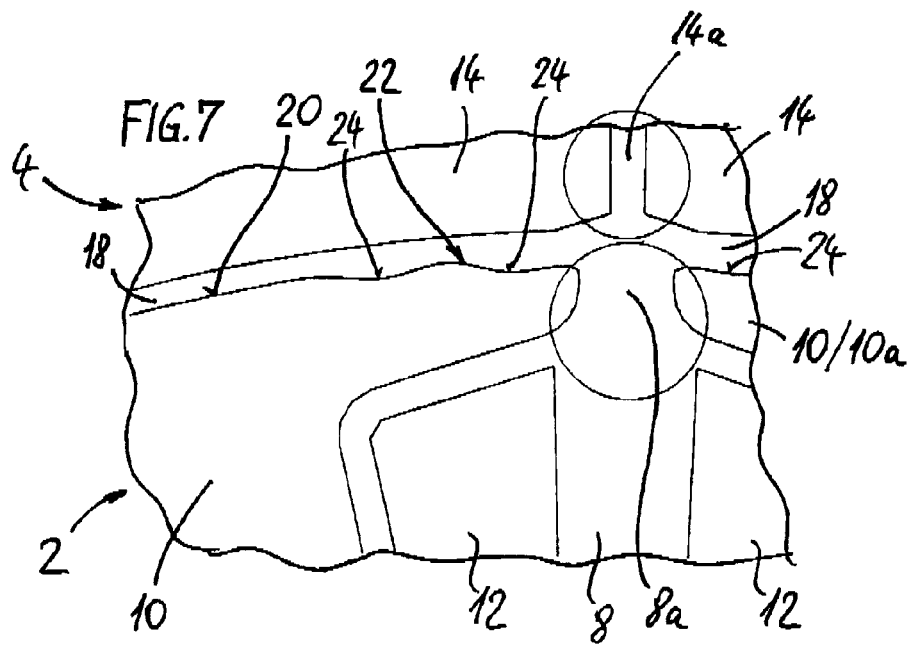
FIG. 7 shows another illustration similar to FIG. 5 detailing the operating principle of the invention.

As is in particular apparent from the illustrations in FIGS. 6 and 7, any wave-like topographic region 22 consisting of several, in particular of two or three concave recesses 24 which adjoin one another in the circumferential direction and merge into one another tangentially and without interruption is suitable for adaptation to different designs of the electric motor 1. As a result of this, a convex transition is respectively formed between two adjacent recesses 24. The recess 24 located next to the respective slot opening 8a preferably has the greatest radial depth, wherein the depths of the other recesses 24 will decrease with increasing angular distance φ from the central axis of the slot 26. This results in a contour similar to a fading away (sine) wave.

Figure 5:
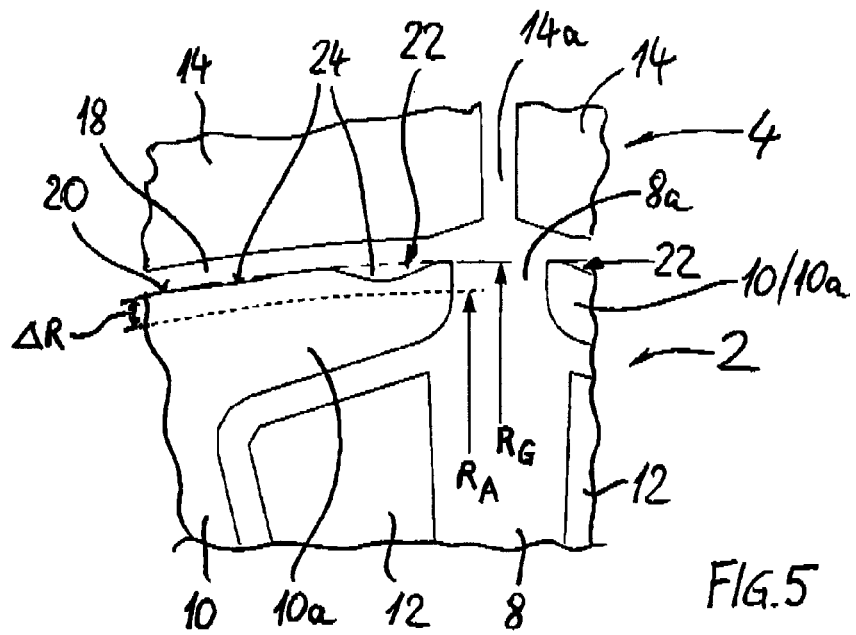
FIG. 5 shows the region V from FIG. 1 in an enlarged representation.

As is apparent from FIG. 5, all recesses 24 of the wave-like topographic regions 22 are designed with respect to their maximum radial depth such that they are located within a radial depth region ΔR, which is up to 3% of the total radius RG of the stator 2 and/or of the iron core 6 in the region of the stator tooth surface 20 located outside of the wave-like topographic region 22. FIG. 5 also shows a maximum possible radial depth of the recesses 24 with a radius of recess RA. In this case, RA is at least 0.97, RG (RA≥0.97 RG).

As is illustrated in FIG. 4, in each wave-like topographic region 22, starting at the central axis of the slot 26, there is a first concave recess 24 in a first angle region φ1 of 4° to 6°, for example. A second, concave recess 24 can adjoin to the first recess 24 which preferably has a smaller radial depth, and which extends, following the first angular range φ1, over a second angular range φ2 of 4° to 8°, for example. Finally, a third concave recess 24, again with a preferably further reduced radial depth, can optionally adjoin the second recess 24, and extends, following the second angular range φ2, over a third angular range φ3 of 5°, for example.

In this case, the number, the depth and the circumferential extension of the respective recesses 24 and the associated angular ranges substantially depend on the number of poles of the motor. In a particularly preferred embodiment, the stator 2 has twelve stator slots 8 and accordingly twelve stator teeth 10. Thus, N=12 is preferred. The number P of pole magnets 14 in this case is preferably P=N±2 or P=N±4. From this, a pole number P of ten or fourteen, but also of eight or sixteen result. In any case, P≠N should apply, so that the motor can generate a sufficient torque with three winding strands.

For the preferred pole numbers P the angular ranges φ1, φ2 and φ3 can be set up according to the following table:

| Number of poles P | φ1 | φ2 | φ3 |
|---|---|---|---|
| 10 | 6° | 7.5° | — |
| 14 | 4° | 5° | — |
| 8 | 6° | 4° | 5° |
| 16 | 6° | 7° | — |

The embodiment with P=10 is illustrated in FIG. 6a, the embodiment for P=14 in FIG. 6b, and the embodiment for P=8 in FIG. 6c, and finally the embodiment for P=16 is illustrated in FIG. 6d. It is apparent from these illustrations that the precise profile contour of the topographic regions 22 can vary within the described margins.

Figure 8:
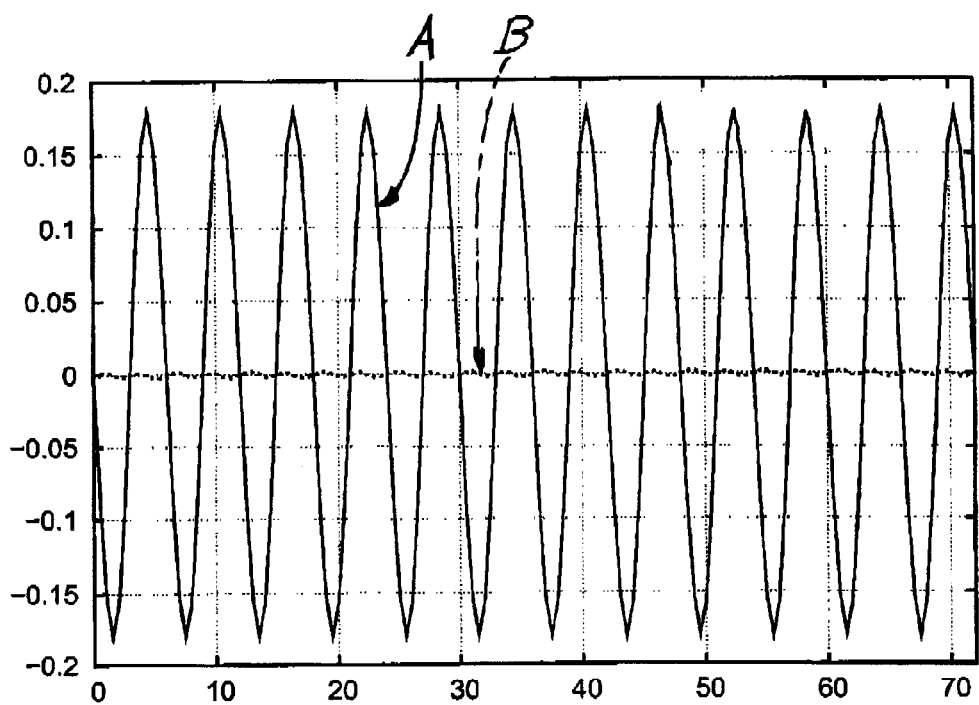
FIG. 8 shows a diagram to illustrate the cogging torque according to the present invention, in comparison with the prior art.

In conclusion, reference is again made to the operating principle of the invention in FIGS. 7 and 8. Normally a cogging torque is produced by the interaction of the pole transition 14a with the slot opening 8a. The recesses in the material 24 of the wave-like topographic regions 22 provided according to the invention, however, also generate a torque fluctuation. Due to their offset in the circumferential direction with respect to the slot openings 8a, this fluctuation is, however, in counter-phase to the actual cogging torque and has a similar amplitude. The torque fluctuations caused by the recesses 24 and the cogging torque overlap and entirely or at least partly cancel each other out. This is illustrated in the diagram in FIG. 8. The normal cogging torque is drawn in by a solid curve A with high amplitude. The torque characteristic resulting from the application of the present invention is illustrated as a dotted line B in FIG. 8 which only slightly fluctuates around zero. Thus, the amplitude is considerably reduced. The basic vibration of the permanent magnet flux linkage, however, is reduced here by only about 1%. The high torque density of the motor thus remains advantageously unaffected.

The invention is not restricted to the illustrated and described exemplary embodiments, but also encompasses all embodiments which are equivalent within the meaning of the invention. It is expressly emphasized that the exemplary embodiments have not been restricted to the combination of all characteristics, but rather each individual partial characteristic can also be fundamental to the present invention by itself and separate from all other partial characteristics. Furthermore, the invention can also be defined by any other particular combination of specific characteristics of all disclosed, individual characteristics. This means that basically each individual characteristic may virtually be omitted and/or replaced by at least one individual characteristic disclosed elsewhere in the application.

The invention claimed is:

1. An electric motor (1) comprising a stator (2) and a radially symmetric, permanent-magnet excited rotor (4) provided for rotation relative to the stator (2) about a common motor axis (X), the stator (2) having a radially symmetric iron core (6) with a plurality (N) of stator teeth (10) adjacent to each other in a circumferential direction and separated by stator slots (8) forming slot openings (8a), the rotor (4) having a plurality (P) of circumferentially distributed pole magnets (14), the pole magnets (14) being adjacent to one another via pole transitions (14a), an annular gap (18) being formed radially between the pole magnets (14) of the rotor and the stator teeth (10), each stator tooth (10) of the stator teeth having, on its surface (20) facing the gap (18), two side regions, each of the side regions circumferentially proximate to one of the slot openings (8a), each of the two side regions forming a relief-like topographic region (22) radially enlarging the gap (18), each topographic region having a plurality of concave recesses (24) merging into one another without interruption and forming an uninterrupted, wave-like, smooth and edge-free profile in the circumferential direction, each stator tooth having, on its surface (20) facing the gap (18), only concave recesses that are part of one of the pluralities of concave recesses, each concave recess of each plurality of concave recesses having a radially measured maximum depth, the maximum depths of each plurality of concave recesses decreasing with increasing angular distance ($\phi$) from a central axis of the slot (26).

2. The electric motor according to claim 1, further comprising that the stator teeth (10) have a constant radius along a path parallel to the motor axis (X) in each relief-like topographic region (22).

3. An electric motor according to claim 1, further comprising that the relief-like topographic regions (22) are configured symmetric in the circumferential direction with respect to central radial axes (26) of the slots (8).

4. An electric motor according to claim 1, further comprising that each relief-like topographic region (22) extends from the slot opening across a circumferential angular range ($\phi$).

5. An electric motor according to claim 1, further comprising that the stator has an outer radius and the plurality of concave recesses (24) of the relief-like topographic regions (22) defining radial depth regions ($\Delta R$) with the maximum depths amounting to up to 3% of the outer radius ($R_G$) of the stator (2).

6. An electric motor according to claim 1, further comprising that each relief-like topographic region has a first concave recess (24) of the plurality of concave recesses proximate to the adjacent slot (26) in a first angular range ($\phi_1$) extending across 4° to 6°.

7. The electric motor according to claim 6, further comprising that each relief-like topographic region further has a second angular range ($\phi_2$) extending across 4° to 8°, the second angular range ($\phi_2$) adjoining the first angular range ($\phi_1$) without interruption and a second concave recess (24) of the plurality of concave recesses shallower than the first concave recess.

8. The electric motor according to claim 7, further comprising that each relief-like topographic region further has a third angular range ($\phi_3$) of up to 5°, the third angular range adjoining the second angular range ($\phi_2$) without interruption and including a third concave recess (24) of the plurality of concave recesses shallower than the second concave recess.

9. An electric motor according to claim 1, further comprising that the pole transitions (14a) of the rotor (4) are formed by intervals between magnet elements of the circumferentially distributed pole magnets.

10. An electric motor according to claim 1, further comprising that the circumferentially distributed pole magnets are formed by a ring-shaped magnet of alternating magnetic polarities and the pole transitions (14a) being formed by zero crossings of the rotor magnetization between the magnetic polarities.

11. An electric motor according to claim 1, further comprising that the pole magnets (14) of the rotor and the pole transitions (14a) are configured parallel to the motor axis.

12. An electric motor according to claim 1, further comprising that the rotor motor is configured as an external rotor motor, the rotor (4) coaxially enclosing the stator (2).

\* \* \* \* \*